April 30, 1968    J. D. MYERS ET AL    3,380,555
SYSTEM FOR LUBRICATION OF ROTATING ELEMENTS
Filed Aug. 18, 1965
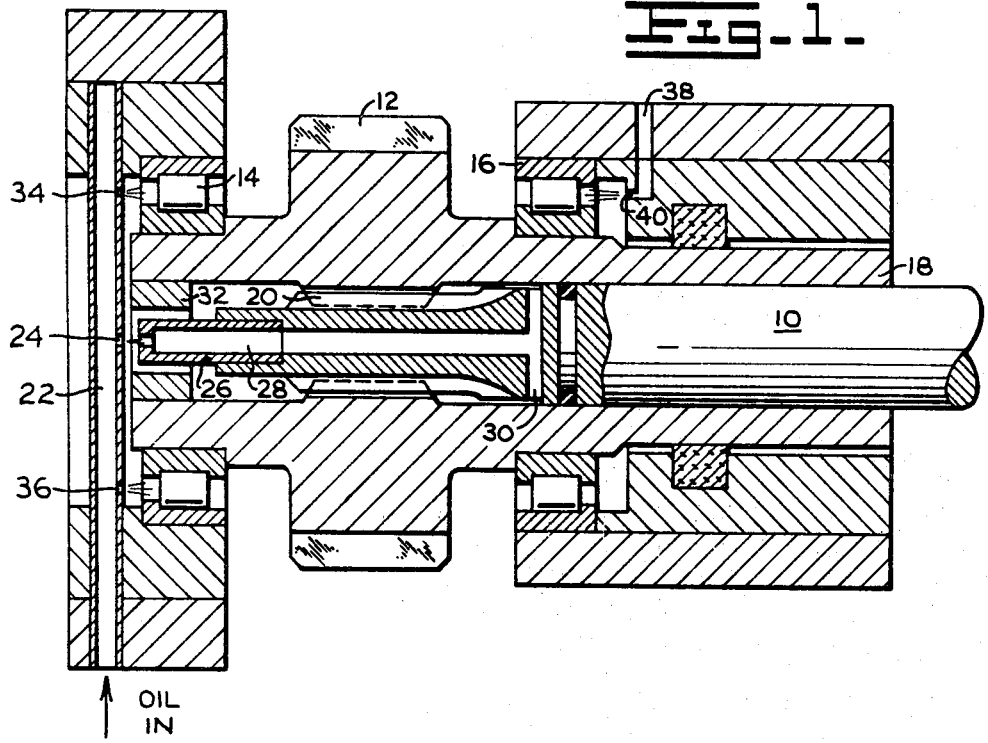
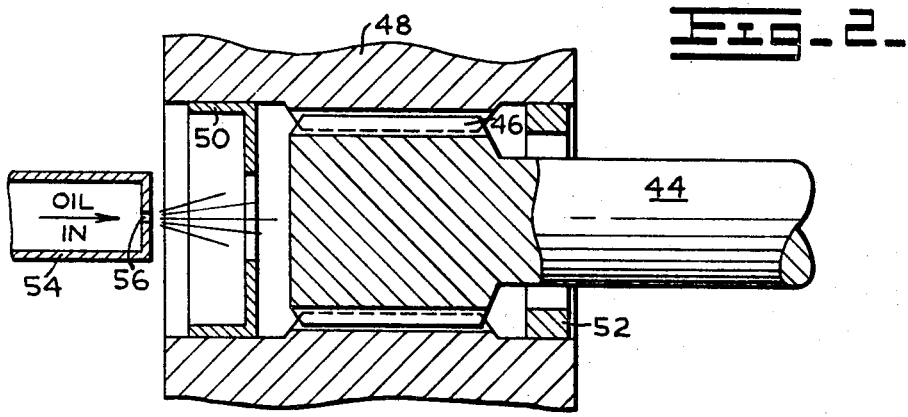
INVENTORS
JIMMY D. MYERS
BY WALLACE G. STEVENS
ATTORNEYS

United States Patent Office 3,380,555
Patented Apr. 30, 1968

3,380,555
SYSTEM FOR LUBRICATION OF ROTATING ELEMENTS
Jimmy D. Myers, Morton, and Wallace G. Stevens, Peoria, Ill., assignors to Caterpillar Tractor Co., Peoria, Ill., a corporation of California
Filed Aug. 18, 1965, Ser. No. 480,588
1 Claim. (Cl. 184—6)

ABSTRACT OF THE DISCLOSURE

A system for lubrication of rotating elements and particularly for high speed rotating elements where it is undesirable to employ a bath of lubricant retained in the vicinity of the elements by seals or the like and including means to inject a lubricant into a space within which the elements are disposed and retain an adequate supply therein by the use of dams.

---

The device of the invention was devised to lubricate a splined connection between the output shaft of a gas turbine engine and a gear driven thereby and leading to the gear reduction and accessory section of the engine. The ensuing description will be directed to such a use of the invention though its adaptability to other high speed parts requiring lubrication will become apparent as the description proceeds.

It is the object of the invention to provide means to supply lubricant to a rotating part or assembly in ample quantity to keep the part or assembly completely immersed in lubricant without utilizing an unnecessarily large volume of lubricant and without employing seals.

Further and more specific objects and advantages of the invention and the manner in which it is carried into practice will be apparent from an understanding of the following description wherein reference is made to the accompanying drawing.

In the drawing:

FIG. 1 is a central sectional view through the output shaft of a gas turbine engine and a gear connected therewith for the purpose of transmitting power to the reduction and accessory section of the engine and showing the housing parts which support these members; and FIG. 2 is a schematic view of a simple splined connection between a shaft and the part rotated thereby illustrating a slightly different form of the invention.

In FIG. 1, an output shaft 10 is illustrated as having a driving connection with a gear 12. The gear is rotatably supported in bearings 14 and 16 and the shaft 10 is piloted in an extension 18 of the hub of the gear. A spline connection 20 is formed between a reduced end of the shaft 10 and the bore which extends through the hub of the gear. Chafing and resultant wear take place at the spline during high speed operation unless it is adequately lubricated and in accordance with the present invention, lubricating oil is directed under pressure through a tube 22 which extends through the housing in a position to intersect the axis of the gear 12 and the tube is provided with an orifice 24 which will direct a jet of oil into an aligned orifice in the end of a fitting 26 in the shaft 10. The fitting 26 communicates with a bore 28 in the shaft which through a connecting radial bore 30 directs oil outwardly to the space between the splines on the shaft and then through the spline connection. After passing through the spline connection, the oil flows outwardly through the end of the gear hub and into the housing from which it may be returned to its source by means not shown. The end of the bore in the gear hub is fitted with an annular dam 32 which limits the outward flow of the oil and insures a sort of tubular clump of oil inside of the bore which completely immerses the mating surfaces of the spline connection. The orifice 24 is small for example, it may be approximately .04 inch in diameter but preferably not so small that it will become jammed with particles which might pass an oil filter. Pressure between 30 and 50 p.s.i. is used and in different applications, variation in pressure and orifice size and the size of the dam 32 will produce a desired flow by oil across the surfaces to be lubricated and will insure complete immersion of these surfaces in the oil without the necessity of seals embodying contacting faces subject to wear during high speed operation.

Another desirable feature of the arrangement illustrated in FIG. 1 is that the tube 22 passes the bearing 14 and may have one or two additional orifices as illustrated at 34 and 36 for lubricating the bearing 14. The bearing 16 may be similarly lubricated by oil directed toward it through a passage 38 and suitably positioned orifice 40.

A very simple form of the invention is illustrated in FIG. 2 showing the adaptability of the invention to the lubrication of parts in different environments. In FIG. 2, a shaft 44 is connected through a spline 46 with a gear 48 or other part to be driven and anular dams 50 and 52 are provided in the opposite ends of the bore in which the spline is disposed. A tube 54 with an orifice 56 delivers a jet of oil through the central opening of the dam 50 and into the spline area. Since it is desired that the oil will flow out through the opposite end of the bore or through the dam 52 this dam is made narrower and just sufficiently wide to maintain the spline immersed. Again, variation in the pressure, orifice size and size of the dams 50 and 52 can be made to create the quantity and flow of oil desired.

We claim:

1. A system for supplying a bath of lubricant to parts operating within a cylindrical space comprising means to inject a jet of lubricant into said space through an opening at one end thereof and to direct the lubricant to said parts, and an annular dam at an end of said space to limit the flow of liquid outwardly therefrom, said operating parts comprising a spline between a shaft and the inner wall of said space, said shaft having passages from its end to a point beyond the spline to direct oil back through the spline teeth and thence through the annular dam.

References Cited

UNITED STATES PATENTS

| 2,053,542 | 9/1936 | Vandervoort | 184—11 |
| 1,656,176 | 1/1928 | Dodge. | |
| 3,326,423 | 6/1967 | Clark | 184—7 X |

FOREIGN PATENTS

| 871,404 | 6/1961 | Great Britain. |
| 1,344,350 | 10/1963 | France. |

LAVERNE D. GEIGER, *Primary Examiner.*

H. BELL, *Assistant Examiner.*